US009714695B2

(12) United States Patent
Barendrecht

(10) Patent No.: US 9,714,695 B2
(45) Date of Patent: Jul. 25, 2017

(54) VARIABLE-SPEED BELT DRIVE

(71) Applicant: FRANCE REDUCTEURS, les Herbiers (FR)

(72) Inventor: Wouter Barendrecht, Cholet (FR)

(73) Assignee: FRANCE REDUCTEURS, les Herbiers (FR)

( * ) Notice: Subject to any disclaimer, the term of this patent is extended or adjusted under 35 U.S.C. 154(b) by 153 days.

(21) Appl. No.: 14/436,499

(22) PCT Filed: Oct. 14, 2013

(86) PCT No.: PCT/FR2013/052448
§ 371 (c)(1),
(2) Date: Apr. 17, 2015

(87) PCT Pub. No.: WO2014/060691
PCT Pub. Date: Apr. 24, 2014

(65) Prior Publication Data
US 2016/0169354 A1    Jun. 16, 2016

(30) Foreign Application Priority Data
Oct. 18, 2012    (FR) ..................... 12 59916

(51) Int. Cl.
*F16H 55/56*    (2006.01)
*F16H 59/00*    (2006.01)
(Continued)

(52) U.S. Cl.
CPC ............. *F16H 9/18* (2013.01); *F16H 55/56* (2013.01); *F16H 63/06* (2013.01); *F16H 63/067* (2013.01); *F16H 61/66272* (2013.01)

(58) Field of Classification Search
CPC ............ F16H 55/56; F16H 61/66272; F16H 61/6625; F16H 63/067; F16H 55/563
(Continued)

(56) References Cited

U.S. PATENT DOCUMENTS 2,283,392 A * 5/1942 Shadrick ............. F16H 61/6625
474/19
2,599,821 A * 6/1952 Friedman ............. F16H 55/566
474/37
(Continued)

FOREIGN PATENT DOCUMENTS

FR    1102759 A    10/1955
FR    2774953 A1    8/1999
(Continued)

OTHER PUBLICATIONS

International Search Report, dated Feb. 3, 2014, from corresponding PCT application.

*Primary Examiner* — Henry Liu
(74) *Attorney, Agent, or Firm* — IPSILON USA, LLP

(57) ABSTRACT

A variable-speed belt drive includes at least: two shafts that can be positioned in a substantially parallel manner; two variably interspaced flange pulleys, one driving, the other driven, one carried by one, the other by the other of the shafts, the pulleys being interconnected by the belt; a speed-variation device controlled by the action of the flanges of the driving pulley being brought together or interspaced; and elements for recalling the flanges in a close position. The speed-variation device is manually controlled and the shaft of the driven pulley is provided with at least one idler member having an outer peripheral surface mounted on the shaft in a freely rotating manner, and around which the belt can wind at least partially in the interspaced position of the flanges of the driven pulley, corresponding to the position with the smallest diameter for the winding of the belt around the shaft.

18 Claims, 7 Drawing Sheets

(51) Int. Cl.
*F16H 61/00* (2006.01)
*F16H 63/00* (2006.01)
*F16H 9/12* (2006.01)
*F16H 9/18* (2006.01)
*F16H 63/06* (2006.01)
*F16H 61/662* (2006.01)

(58) Field of Classification Search
USPC .................................. 474/8, 19, 37
See application file for complete search history.

(56) References Cited

U.S. PATENT DOCUMENTS

| | | | | |
|---|---|---|---|---|
| 2,611,464 A * | 9/1952 | Rabe | F16D 13/18 | 192/78 |
| 2,651,208 A * | 9/1953 | Karig | F16H 9/12 | 474/19 |
| 2,699,071 A * | 1/1955 | Miner | F16H 61/66227 | 474/19 |
| 2,900,834 A * | 8/1959 | Bessette | F16H 55/56 | 474/19 |
| 2,987,934 A * | 6/1961 | Thomas | F16H 61/66227 | 474/12 |
| 3,161,071 A * | 12/1964 | Getz | F16H 55/56 | 474/19 |
| 3,195,364 A * | 7/1965 | Pauli | F16H 55/56 | 474/19 |
| 3,224,287 A * | 12/1965 | Gesche | F16H 9/12 | 474/19 |
| 3,362,242 A * | 1/1968 | Watkins | F16H 55/563 | 474/15 |
| 3,365,967 A * | 1/1968 | Moogk | F16H 9/14 | 474/19 |
| 3,616,706 A * | 11/1971 | Shimamoto | F16H 55/56 | 474/19 |
| 3,757,593 A * | 9/1973 | Svenson | B62M 25/00 | 192/48.92 |
| 3,842,637 A * | 10/1974 | Wilson | A01D 69/06 | 474/19 |
| 4,016,771 A * | 4/1977 | Berens | F16H 55/56 | 384/535 |
| 4,023,635 A * | 5/1977 | Teal | B62M 27/02 | 180/190 |
| 4,033,195 A * | 7/1977 | Takagi | F16H 55/56 | 474/19 |
| 4,078,442 A * | 3/1978 | Bendall | F16H 9/24 | 474/245 |
| 4,173,155 A * | 11/1979 | Togami | A01D 69/06 | 29/256 |
| 4,360,353 A * | 11/1982 | Hattori | F16H 61/66227 | 474/12 |
| 4,364,735 A * | 12/1982 | Plamper | F16H 55/563 | 474/13 |
| 4,378,221 A * | 3/1983 | Huff | F16H 55/56 | 192/111.1 |
| 4,400,930 A * | 8/1983 | Huhman | A01F 12/56 | 474/19 |
| 4,515,041 A * | 5/1985 | Frank | B60W 10/06 | 477/43 |
| 4,523,917 A * | 6/1985 | Schildt | F16H 55/56 | 474/19 |
| 4,568,317 A * | 2/1986 | Steuer | F16H 13/14 | 474/19 |
| 4,592,737 A * | 6/1986 | Dhont | A01D 69/06 | 474/17 |
| 4,605,386 A * | 8/1986 | Harris | F16H 55/56 | 474/17 |
| 4,689,036 A * | 8/1987 | Love | F16H 61/6625 | 474/17 |
| 4,738,651 A * | 4/1988 | Favache | F16H 13/14 | 474/19 |
| 5,403,240 A * | 4/1995 | Smith | F16H 61/66272 | 474/19 |
| 5,516,333 A * | 5/1996 | Benson | F16H 61/6625 | 192/54.52 |
| 6,095,937 A * | 8/2000 | Aaen | F16D 43/218 | 192/54.52 |
| 6,123,634 A * | 9/2000 | Faust | F16H 55/32 | 474/18 |
| 6,149,540 A * | 11/2000 | Johnson | F16H 61/66227 | 474/14 |
| 6,196,367 B1 * | 3/2001 | Hanabusa | A01D 34/6806 | 192/3.54 |
| 6,413,178 B1 * | 7/2002 | Chamberland | F16H 55/56 | 474/12 |
| 6,502,479 B1 * | 1/2003 | Lee | F16H 55/563 | 474/11 |
| 6,520,878 B1 * | 2/2003 | Leclair | F16H 61/66245 | 474/12 |
| 6,569,043 B2 * | 5/2003 | Younggren | F16H 55/56 | 474/19 |
| 6,743,129 B1 * | 6/2004 | Younggren | F16H 55/56 | 474/17 |
| 6,755,759 B2 * | 6/2004 | Blanchard | F16H 9/18 | 474/19 |
| 6,860,826 B1 * | 3/2005 | Johnson | B62M 27/02 | 180/376 |
| 7,179,183 B2 * | 2/2007 | Borghi | F16H 55/56 | 474/19 |
| 7,614,970 B2 * | 11/2009 | Teijido | A01D 69/06 | 474/10 |
| 7,674,197 B2 * | 3/2010 | Aitcin | F16H 55/56 | 474/10 |
| 7,850,555 B2 * | 12/2010 | Keane | A01D 69/08 | 474/11 |
| 7,901,308 B2 * | 3/2011 | Binello | F16H 55/56 | 474/10 |
| 8,328,669 B2 * | 12/2012 | Nouis | F16H 63/067 | 474/10 |
| 8,393,985 B2 * | 3/2013 | Blanchard | F16H 55/56 | 474/19 |
| 9,005,058 B2 * | 4/2015 | Ouchida | F16H 61/66272 | 474/19 |
| 2002/0065156 A1 * | 5/2002 | Younggren | F16H 55/56 | 474/19 |
| 2002/0183145 A1 * | 12/2002 | Blanchard | F16H 9/18 | 474/19 |
| 2003/0054909 A1 * | 3/2003 | Flaspeter | F16H 55/56 | 474/19 |
| 2004/0063524 A1 * | 4/2004 | Zulawski | F16H 55/56 | 474/19 |
| 2004/0092345 A1 * | 5/2004 | Borghi | F16H 55/56 | 474/19 |
| 2004/0142781 A1 * | 7/2004 | Huddleston | F16H 61/66272 | 474/19 |
| 2004/0229724 A1 * | 11/2004 | Kalies | F16H 61/66272 | 474/19 |
| 2004/0266570 A1 * | 12/2004 | Kalies | F16H 55/56 | 474/19 |
| 2005/0043128 A1 * | 2/2005 | Zulawski | F16H 55/56 | 474/19 |
| 2005/0209032 A1 * | 9/2005 | Aitcin | F16H 55/56 | 474/19 |
| 2006/0019781 A1 * | 1/2006 | Roby | F16H 55/56 | 474/8 |
| 2006/0183582 A1 * | 8/2006 | Blanchard | F16H 9/18 | 474/23 |
| 2007/0026981 A1 * | 2/2007 | Blanchard | F16H 55/56 | 474/8 |
| 2007/0105671 A1 * | 5/2007 | Binello | F16H 55/56 | 474/19 |
| 2008/0102998 A1 * | 5/2008 | Teijido | F16H 63/067 | 474/19 |
| 2009/0042678 A1 * | 2/2009 | Labbe | F16H 55/56 | 474/19 |
| 2009/0156338 A1 * | 6/2009 | Galletti | F16H 9/12 | 474/19 |

(56) References Cited

U.S. PATENT DOCUMENTS

| | | | | |
|---|---|---|---|---|
| 2011/0152020 A1* | 6/2011 | Brind'Amour | ......... | F16H 55/56 474/8 |
| 2012/0328454 A1* | 12/2012 | Roby | ...................... | F01P 7/048 417/319 |
| 2013/0005522 A1* | 1/2013 | Raasch | ................... | F02D 29/06 474/19 |
| 2013/0288833 A1* | 10/2013 | Mueller | .................. | F16H 55/56 474/19 |

FOREIGN PATENT DOCUMENTS

| | | |
|---|---|---|
| FR | 2889866 A1 | 2/2007 |
| FR | 2926256 A1 | 7/2009 |

* cited by examiner

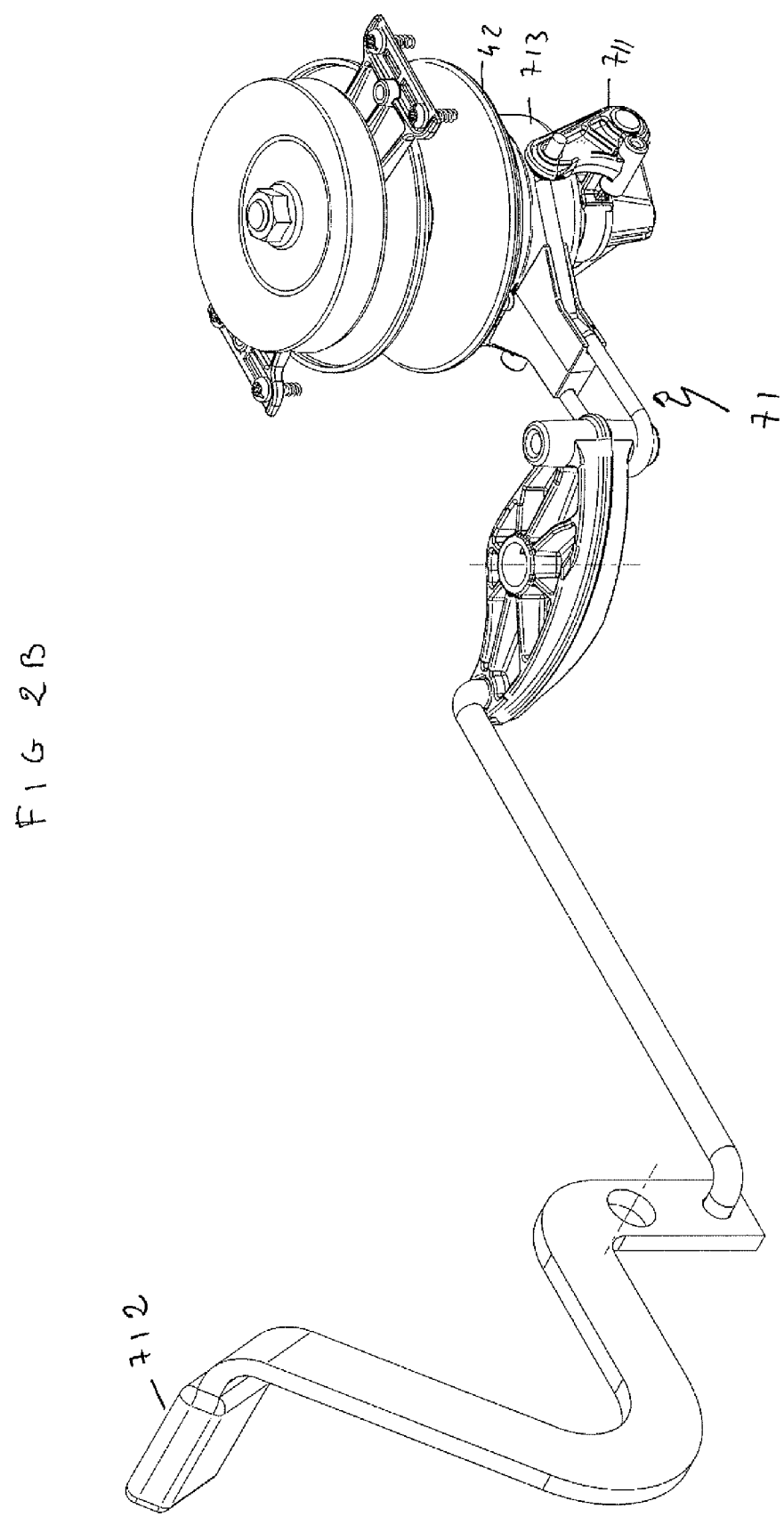

VARIABLE-SPEED BELT DRIVE

The present invention relates to a variable-speed belt drive.

The invention relates more particularly to a variable-speed belt drive of the type comprising at least:
- two shafts which are able to be positioned substantially parallel to one another,
- two flange pulleys, one the driving pulley, the other the driven pulley, one of the flange pulleys being carried by one of the shafts, the other of the flange pulleys being carried by the other of said shafts and interconnected by said belt, the flanges of said pulleys being mounted at a variable interspacing on the shaft which bears them,
- one speed variation device controlled by moving the flanges of the driving pulley closer together/away from one another,
- means for restoring the flanges of said driven pulley into the position where they are moved closer together.

Such a variable-speed belt drive is more particularly designed to be installed on a moving machine such as a lawnmower or a tractor-mower, between the primary engine shaft and the wheels of said machine. The bearing shaft of the driving pulley is capable of forming the primary engine shaft of the machine or of being driven in rotation by the primary engine shaft of the machine. The primary engine shaft of the machine is driven in rotation at a substantially constant speed since this primary engine shaft controls in parallel the driving in rotation of the mowing blade. It is therefore not possible to vary the speed of the mowing blade on each variation in speed of the machine. This constraint, associated in particular with mowing machines, rules out any use of a variable-speed drive or the speed variation would be controlled by variation in the speed of driving in rotation of the bearing shaft of the driving pulley, on account of the fact that the said bearing shaft is engaged with, or constitutes, the primary engine shaft rotating at constant speed. For this reason, speed variation devices with automatic action, as described in the document FR-2 926 256, cannot be used.

Moreover, in many cases, the shaft of the driven pulley of the variable-speed drive constitutes the input shaft of a transmission housing provided with an output shaft for driving the wheels of the machine. In the event of a high resistant torque on the input shaft, as is the case when a machine has to cross a slope with a very steep gradient, there is a high risk of said input shaft being prevented from rotating by the resistant torque with a risk of breakage in the region of components downstream of the variable-speed drive. Solutions are therefore being sought for limiting the torque transmissible by the variable-speed drive to the input shaft of the transmission so as to avoid torques exceeding the breaking points of the components downstream of the variable-speed drive. One solution consists in limiting the winding diameter of the belt about the driven pulley. Hitherto, this limitation has been obtained with the aid of a mechanical stop against which the movable flange of the driven pulley bears in the position of maximum interspacing of the flanges corresponding to the minimum winding diameter of the driven pulley. This flange is moved closer to the other flange by a spring. In the abutment position of the movable flange, the driven pulley behaves like a pulley with fixed flanges, such that the pressure force of the restoring spring on the belt can no longer be controlled. Under these conditions, the torque transmitted is no longer controlled. Moreover, this results in a risk of jamming of the belt between the flanges of the pulley. This solution is therefore not satisfactory.

An object of the present invention, therefore, is to propose a variable-speed drive, the design thereof making it possible to reduce the risks of breakage of the transmission downstream of the variable-speed drive and to control the minimum winding diameter of the belt without impairing the operation of the restoring means or the control force for speed variation.

A further object of the present invention is to propose a variable-speed drive, the design thereof permitting any risk of jamming of the belt between the flanges of the driven pulley to be avoided in the position of maximum speed of the flanges of the driven pulley.

To this end, the subject of the invention is a variable-speed belt drive of the type comprising at least:
- two shafts which are able to be positioned substantially parallel to one another,
- two flange pulleys, one the driving pulley, the other the driven pulley, one of the flange pulleys being carried by one of the shafts, the other of the flange pulleys being carried by the other of said shafts and interconnected by said belt, the flanges of said pulleys being mounted at a variable interspacing on the shaft which bears them,
- one speed variation device controlled by moving the flanges of the driving pulley closer together/away from one another,
- means for restoring the flanges of said driven pulley into the position where they are moved closer together, characterized in that the speed variation device controlled by moving the flanges closer together/away from one another comprises means for control by moving the flanges of the driving pulley closer together by so-called manual control, and control assisting means by moving the flanges of the driving pulley closer together and in that the shaft of the driven pulley is provided with at least one idle member such as a bearing, a roller or a ring, having an external peripheral surface mounted freely at least one terms of rotation on said shaft and about which the belt is capable of being wound at least partially in the position of the flanges of the driven pulley where they are moved away from one another, corresponding to the position of the smallest winding diameter of the belt about said shaft.

Moving the flanges of the driving pulley together is thus controlled manually by the speed variation device while the idler member is arranged on the driven pulley in order to act, in combination with the restoring means, at maximum speed of the variable-speed drive, and to fulfill, with said restoring means, the function of torque limiter. The presence of control assisting means with automatic action depending on the torque transmitted makes it possible to reduce the control effort to be produced for the speed variation.

Preferably, the control assisting means by moving the flanges of the driving pulley closer together comprise a cam formed by two coaxial plates having inclined ramps with sliding contact, one of the plates being fixed in terms of rotation to the, or a, movable flange of the driving pulley, the other plate being fixed in terms of rotation to the bearing shaft of the driving pulley, said plates tending to move away from one another in the direction of the flanges of the driving pulley being moved closer together under the action of the transmitted torque.

As opposed to means for control by moving the flanges of the driving pulley closer together which are manual control means, that is to say ones which require the action of an operator in order to allow the flanges to be moved closer together, the assisting means have automatic actuation and act by virtue of the friction contact of the belt against the movable flange of the driving pulley.

Further preferably, the idle member is axially immobilized on the bearing shaft of the driven pulley.

Preferably, one of the flanges of the driven pulley, recessed in the center so as to be able to be threaded onto the bearing shaft of said pulley, is provided about the central recess with an annular housing of the idle member, when said flanges are moved closer together.

This arrangement makes it possible to increase the path of the flanges in the direction of moving said flanges closer together or away from one another.

Preferably, in the position of the smallest winding diameter of the belt about said shaft of the driven pulley, when the belt bears against the external peripheral surface of the idle member, one of the flanges of the driven pulley is mounted with clearance and is axially displaceable along said bearing shaft of the driven pulley in the direction of the other flange being moved away.

This clearance makes it possible to prevent the driven pulley from behaving in a manner which is similar to that of a pulley with fixed flanges in the position of the smallest winding diameter of the belt about the shaft of said pulley and to maintain the effectiveness of the restoring means.

Preferably, the means for restoring the flanges of the driven pulley into the position in which they are moved closer together comprise at least one spring. Preferably, the flange of the driven pulley, mounted with clearance and axially displaceable along said bearing shaft of the driven pulley, in the position of the smallest winding diameter of the belt about said shaft of the driven pulley, when the belt bears against the external peripheral surface of the idle member, is the flange which is spring-loaded.

Preferably, one of the flanges, the so-called fixed flange, of the driven pulley is produced in one piece with a core threaded onto the bearing shaft of the pulley and mounted fixedly in terms of rotation on said shaft, and the other flange, the so-called movable flange, of the driven pulley is recessed in the center and received by nesting on said core for being mounted in an axially free manner and fixedly in terms of rotation to said core, said movable flange being provided with means for restoring the flanges of the driven pulley into the position where they are moved closer together. Preferably, said flanges define relative to one another a groove of variable dimension, the belt of the variable-speed drive being capable of being inserted therein, and at least one of the flanges is a flange made of synthetic material provided, on its surface opposite the other flange, with a metal covering taking the form of a dish recessed in the center and the dish in its zone adjacent to the central recess being moved away from the flange which it covers by a so-called annular peripheral space which, by preventing any direct contact between the flange and the dish, reduces in said zone the heat exchange between the flange and dish, when the dish is assembled to the flange.

This design makes it possible to avoid the heating and fusion of the material which constitutes the flange when the belt slides.

Preferably, the movable flange of the driven pulley is formed by a circular plate recessed in the center, said central recess being provided with an edge protruding at least on one side from said plate, so as to form a shank coaxial with the core of the pulley, said edge being an edge comprising a shoulder to create the annular housing of the idle member when said flanges are moved closer together, the restoring means of the movable flange in the direction of the fixed flange taking the form of a helicoidal spring wound around the shank of the movable flange.

This design permits contact between synthetic material/synthetic material when the shank is made of synthetic material. This contact facilitates a mounting of the flanges which is fixed in terms of rotation and an axial displacement of the flanges relative to a contact between metal/synthetic material.

Preferably, the driving pulley, one of the flanges thereof, the so-called fixed flange, being mounted fixedly in terms of rotation on the bearing shaft of the driving pulley and the other flange thereof, the so-called movable flange, being mounted in an axially movable manner on the bearing shaft of the driving pulley in the direction of being moved closer to the fixed flange by means of the speed variation device, is a disengageable pulley and comprises disengagement means formed by at least one annular part arranged between said flanges, said annular part having an external peripheral surface, mounted freely in terms of rotation relative to the bearing shaft of the driving pulley, and about which the belt is wound at least partially in the disengaged position corresponding to the position in which the flanges are moved away from one another so as to prevent any transmission of movement between the pulley bearing shafts, the movable flange of the driving pulley covering the annular part when the flanges of said pulley are moved closer together, so as to permit the winding of the belt inside the groove formed by the flanges and to permit the passage of the variable-speed drive into the engaged position, and continuing to move the flanges of the driving pulley closer together allows the variation of speed as required.

Further preferably, the driving pulley is provided with resilient means for restoring the flanges thereof into the position where they are moved away from one another.

Further preferably, the means for control by moving the flanges of the driving pulley closer together by manual control comprise a control member which is able to be coupled to a lever, a handle or a pedal able to be actuated by the hand or the foot of the operator.

Preferably, as the driving pulley is of the type where one of the flanges, the so-called movable flange, is mounted in an axially movable manner on the bearing shaft of the driving pulley in the direction of being moved closer to the other flange of the pulley, the control member of the means for control by moving the flanges of the driving pulley closer together by manual control is activated by pushing directly or indirectly on said flange.

Preferably, when the control member of the means for control by moving the flanges of the driving pulley closer together is activated on said movable flange of the driving pulley by pushing indirectly, said control member is activated by pushing via a bell-shaped part threaded onto the bearing shaft of the driving pulley and mounted fixedly in terms of rotation on said movable flange, said bell being provided at its apex with a bearing on which the control member is capable of acting.

The invention will be clearly understood by reading the following description of exemplary embodiments, with reference to the accompanying drawings, in which.

Figure 1:
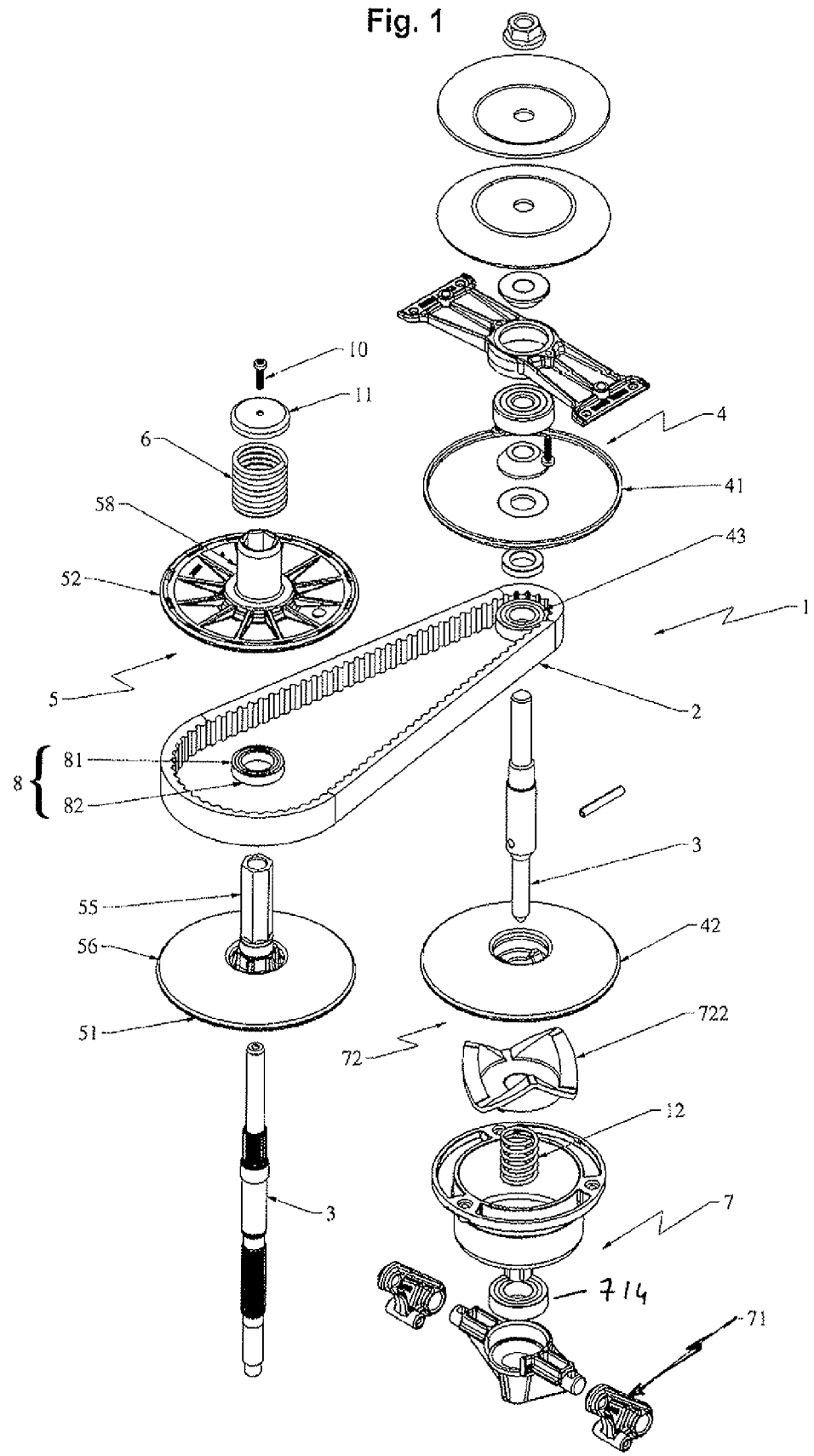
FIG. 1 shows a view in the exploded position of the elements of the variable-speed drive.
Figure 2:
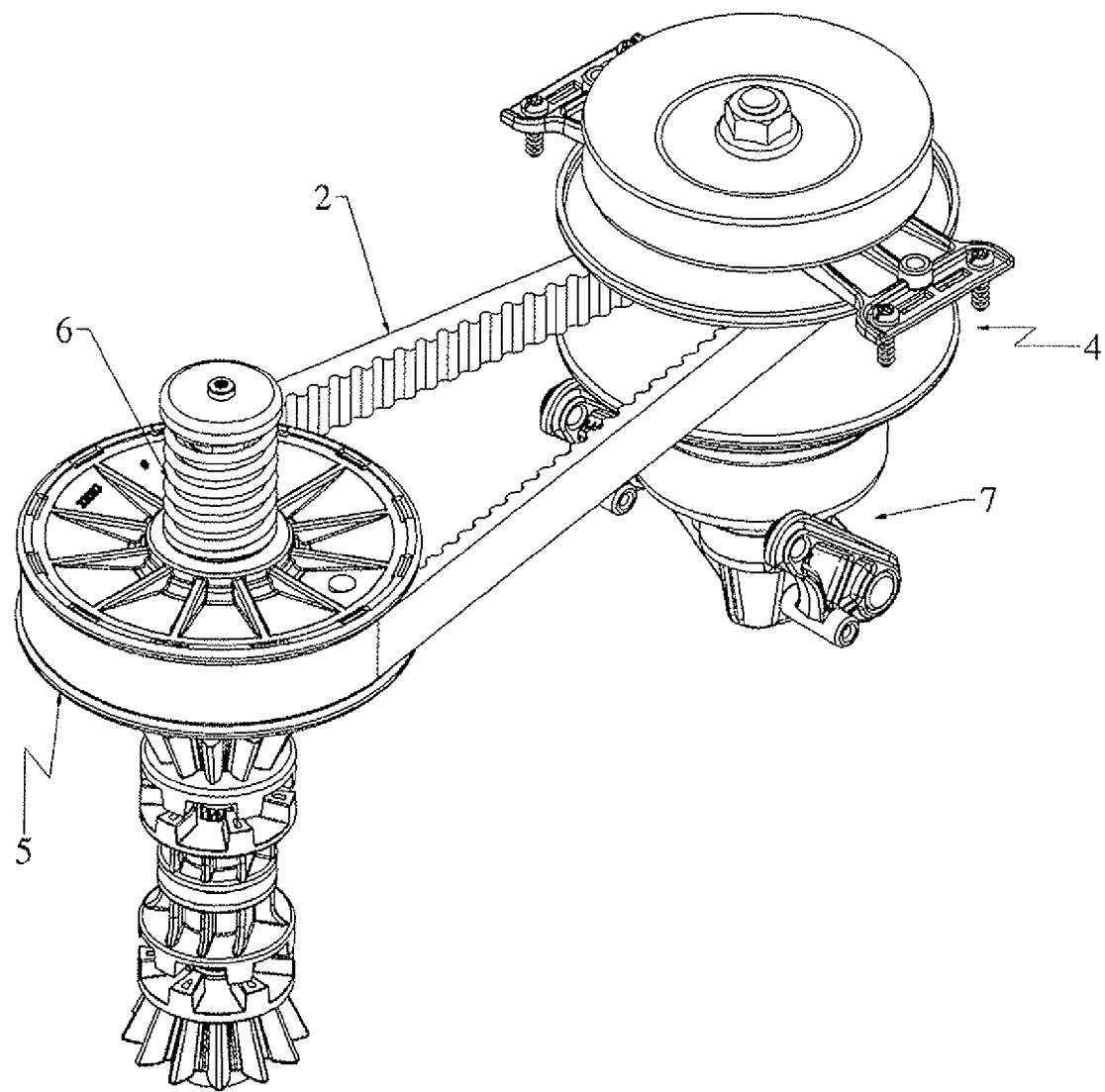
FIG. 2A shows a view in the assembled position of the elements of the variable-speed drive.
FIG. 2B shows a view in perspective of the driving pulley and means for control by moving the flanges of said pulley closer together.

As mentioned above, the variable-speed drive 1 comprises two variably interspaced flange pulleys 4, 5 connected together by a belt 2 inserted inside the groove of each of the pulleys. One of the pulleys is called the driving pulley of the variable-speed drive and is shown by 4 in the figures. The other pulley is called the driven pulley and is shown by 5 in the figures. These pulleys are each carried by a shaft 3. The flanges of the pulleys are recessed in the center so as to be able to be threaded onto the shaft and are generally of frustoconical shape so as to form relative to one another a V-shaped groove for receiving the belt 2. Such a variable-speed drive may be installed on a machine with a walking operator, such as a lawnmower, or with a driver on board, such as a tractor, in particular a tractor-mower. The bearing shaft of the driving pulley which is a rotational shaft capable of being driven in rotation may be formed by the primary engine shaft of the machine or carry an additional pulley connected by an endless belt transmission to a pulley carried by the primary engine shaft so as to permit the transmission of the movement of the primary engine shaft to the bearing shaft of the driving pulley. This bearing shaft of the driving pulley is able to be driven in rotation at any speed which may be constant or not. In the example illustrated below, this speed is constant (to be confirmed by the inventor). The bearing shaft 3 of the driven pulley 5 may be formed by the input shaft of a transmission housing accommodating at least partially the output shaft for driving the wheels of the machine.

Such a variable-speed drive further comprises a device 7 for controlling the variable-speed drive by manual control by moving the flanges of one of the pulleys closer together/away from one another and means 6 for restoring the flanges 51, 52 of the driven pulley 5 into the position where they are moved closer together. In such a variable-speed drive, the speed variation is obtained by varying the winding diameter of the belt 2 inside grooves of the pulley. At maximum speed, on such a variable-speed drive, a large winding diameter of the belt is observed in the region of the driving pulley 4 and a small winding diameter of the belt in the region of the driven pulley 5. Moving the flanges of one pulley closer together or away from one another makes it possible to vary the winding diameter of the belt about the pulley and, as a result, the speed of driving in rotation the bearing shaft of the flanges of the driven pulley. In the examples shown, it is the driving pulley 4 which is the pulley controlled by the speed variation device 7.

Said driving pulley 4 comprises a fixed flange 41 mounted fixedly in terms of rotation on the bearing shaft 3 of the pulley 4, for example by means of flutes, and a flange 42, the so-called movable flange, movably mounted in the direction of moving closer to the flange 41 or moving away from said flange using the device 7 for controlling the speed variation which comprises means for control 71 by moving the flanges 41, 42 of the driving pulley 4 closer together by axial displacement of the flange 42 along said shaft. Said means for control 71 by moving the flanges of the driving pulley closer together by manual control are configured so as to permit an axial displacement of at least one of the flanges, in this case the movable flange 42, of the driving pulley along the bearing shaft of the driving pulley, independently of the speed of rotation of the bearing shaft of said driving pulley.

Said means for control 71 may comprise a control member such as a fork which is able to be actuated manually by the driver of the machine using, for example, a cam control or rod control, itself actuated by the operator using a lever or a pedal. The means for control 71 comprise, therefore, a control member 711 which is able to be coupled to a lever, a handle or a pedal 712 which is able to be actuated by the hand or the foot of the operator which is why they are called manual control means. This control member 711, controlled here by a foot pedal 712 which is connected by a rod to said control member 711, acts in the example shown by pushing onto the flange 42 via a bell-shaped part 713 threaded onto the bearing shaft 3 of the driving pulley 4, this bell 713 being provided at its apex with a bearing 714 to permit the action of the control member 711 on the movable flange 42 connected to said bell 713 mounted fixedly in terms of rotation on said flange 42. The control device 7 may further comprise control assisting means 72. Said control assisting means 72 take the form of a cam consisting of two coaxial plates with an inclined ramp with sliding-contact, one of the plates, shown at 721, being fixed in terms of rotation to the movable flange 42 of the driving pulley, the other plate, shown at 722, being fixed in terms of rotation to the bearing shaft 3 of the pulley. A spring 12 housed inside the bell between the plate 722 fixed in terms of rotation to the shaft and the apex of the bell restores the flanges 41, 42 of the driving pulley 4 into the position moved away from one another. Generally, the ramp carrier plate 721 which is fixed in terms of rotation to the movable flange is produced in one piece with said flange.

When the belt is driven in rotation, said plates 721, 722 tend to move away from one another under the action of said belt. This moving of the plates 721, 722 away from one another causes the flanges 41, 42 of the driving pulley 4 to be moved closer together. This axial force generated on the flanges in the direction of moving the flanges closer together is proportional to the transmitted torque.

The driving pulley 4 is also a disengageable pulley. To this end, the driving pulley 4 comprises disengagement means 43, formed here from an annular part, in this case a bearing arranged between the flanges 41, 42 for the passage of the driving pulley 4 from a disengaged position, corresponding to the position in which the flanges 41, 42 of the driving pulley are moved away from one another and the belt 2 comes to bear against the external peripheral surface of the annular part of the disengagement means 43, to an engaged position in which the flanges 41, 42 are moved closer together and prevent any bearing contact of the belt 2 with the annular part of the disengagement means 43.

Moving the flange 42 and the flange 41 closer together, therefore, makes it possible to control the passage of the pulley from the disengaged position to the position of minimum speed, the speed gradually increasing as the flanges are moved closer together. The driven pulley 5 in turn is formed here from a flange 51, the so-called fixed flange, mounted in an axially fixed manner and fixedly in terms of rotation to the bearing shaft 3 of the pulley, and a flange 52, fixed in terms of rotation to the shaft 3 and axially movable on said shaft.

In the examples shown, the flange 51, the so-called fixed flange, of the driven pulley 5 is produced in one piece with a core 55 threaded onto the bearing shaft 3 of the pulley 5 and mounted fixedly in terms of rotation to said shaft 3. The other flange 52, the so-called movable flange, of the driven pulley 5 is recessed in the center and received by nesting on said core 55 for being mounted in an axially free manner and fixedly in terms of rotation to said core 55. The movable flange 52 is provided with a spring 6 for restoring said flange 52 into the position where it is moved closer to the other flange 51, said restoring spring 6 forming the means of restoring the flanges 51, 52 of the driven pulley into the position where they are moved closer together.

The fixed flange 51, as well as the core 55, are produced in one piece from synthetic material, for example polypropylene. The fixed flange 51 is provided with a metal covering 56 on its surface, opposite the movable flange and serving for defining the groove. The movable flange 52 is in turn either a metal flange, preferably made of aluminum, or a flange made of synthetic material provided with a metal covering on its surface opposing the fixed flange.

In the examples shown, the fixed flange is produced in one piece with the core on which the movable flange is mounted in an axially movable manner and fixedly in terms of rotation. This design makes it possible to limit the number of constituent parts of the pulley. More specifically, the core 55 is a hollow body, open at one of its ends so as to be able to be threaded onto a bearing shaft, said body being provided at, or in the vicinity of, its open end with the fixed flange 51 in the form of a circular plate surrounding said core. As it is produced in one piece with said core, the fixed flange is mounted in an axially fixed manner on said core. This design of the fixed flange allows the movable flange to slide on a core made of synthetic material such that an anti-corrosion treatment is not necessary.

As mentioned above, said fixed flange 51 is provided with a metal covering 56 to avoid premature wear of the assembly. In the examples shown, said metal covering 56 of the fixed flange takes the form of a metal dish 56 recessed in the center so as to be able to be threaded onto said core as far as an end of travel position in which said dish comes into bearing contact and is held so as to cover the surface of the fixed flange opposite the movable flange and serving to define the groove. Preferably, the metal covering of the fixed flange is held in bearing contact on said fixed flange by crimping. The dish which constitutes the covering may be of generally frustoconical shape so as to be adapted to the shape of the surface of the fixed flange serving to define the groove which may also be a surface of generally frustoconical appearance. In the examples shown, the core 55 has an external peripheral polygonal shape, preferably hexagonal, which is complementary to the shape of the central recess of the flange, the central recess 53 of the movable flange 52, for mounting the flange and the core fixedly in terms of rotation. The core which is a blind hollow body open at one end thereof so as to be able to be threaded onto the bearing shaft 3, has at its other end an axial bore, a fixing member 10, such as a screw, being capable of being housed therein, said fixing member, in cooperation with a dish 11 interposed between the fixing member 10 and the movable flange 52, being capable of retaining the movable flange on said core 55. The movable flange 52 of the driven pulley 5 is in turn formed by a circular plate recessed in the center. Said central recess 53 is provided with an edge protruding at least on one side of said plate so as to form a shank 58 coaxial with the bearing shaft 3 of the pulley. The means 6 for restoring the movable flange 52 in the direction of the fixed flange 51 take the form of a helicoidal spring wound around said shank of the movable flange 52 and the bearing shaft 3. The spring 6 is sandwiched between the back of the movable flange and the dish 11 arranged at the end of the bearing shaft 3 and fixed by means of a fixing member 10 to the core 55 of the fixed flange 51. The movable flange 52, in the examples shown, is a flange made of synthetic material which is provided, on its surface opposite the other face, with a metal covering taking the form of a dish recessed in the center. The central recesses of the dish and the flange make it possible to thread the assembly onto the bearing shaft 3. As in the case of the fixed flange 51, the dish constituting the covering of the movable flange 52 may have a generally frustoconical shape so as to be adapted to the shape of the surface of the flange which it covers and which may be of generally frustoconical shape. Each dish, in its zone adjacent to the central recess, is separated from the flange which it covers by a peripheral space which, by preventing any direct contact between the flange and dish, reduces the heat exchange between the flange and the dish in this zone. This peripheral space is shown at 57 in the figures.

In a manner which is characteristic of the invention, the driven pulley 5 further comprises an idle member 8. This idle member 8, formed here by a bearing, is threaded onto the shaft of the driven pulley and is arranged between the flanges 51, 52 of the driven pulley. This idle member 1 has an external circular peripheral surface 82 against which the belt 2 partially bears, in the position of the flanges 51, 52 of the driven pulley 5 where they are moved away from one another, corresponding to the position of the smallest winding diameter of the belt about said shaft and to the position of greatest speed of the variable-speed drive. This external peripheral surface 82 is mounted freely in terms of rotation relative to said shaft 3.

In the example shown, as the idle member 8 is a bearing, it is the external peripheral surface of the external ring of the bearing which forms the external peripheral surface 82, mounted freely in rotation, of said member. This idle member 8 is immobilized axially on the bearing shaft 3 of the driven pulley 5. This axial immobilization is obtained via the core 55 of the flange 51, the so-called fixed flange, of the driven pulley 5. This core 55 comprises a shoulder and a bead between which the idle member 8 is clipped. Moreover, the movable flange 52 of the driven pulley is provided about its central recess 53 with an annular housing 54 of the idle member 8 when said flanges 51, 52 are moved closer together.

Figure 3:
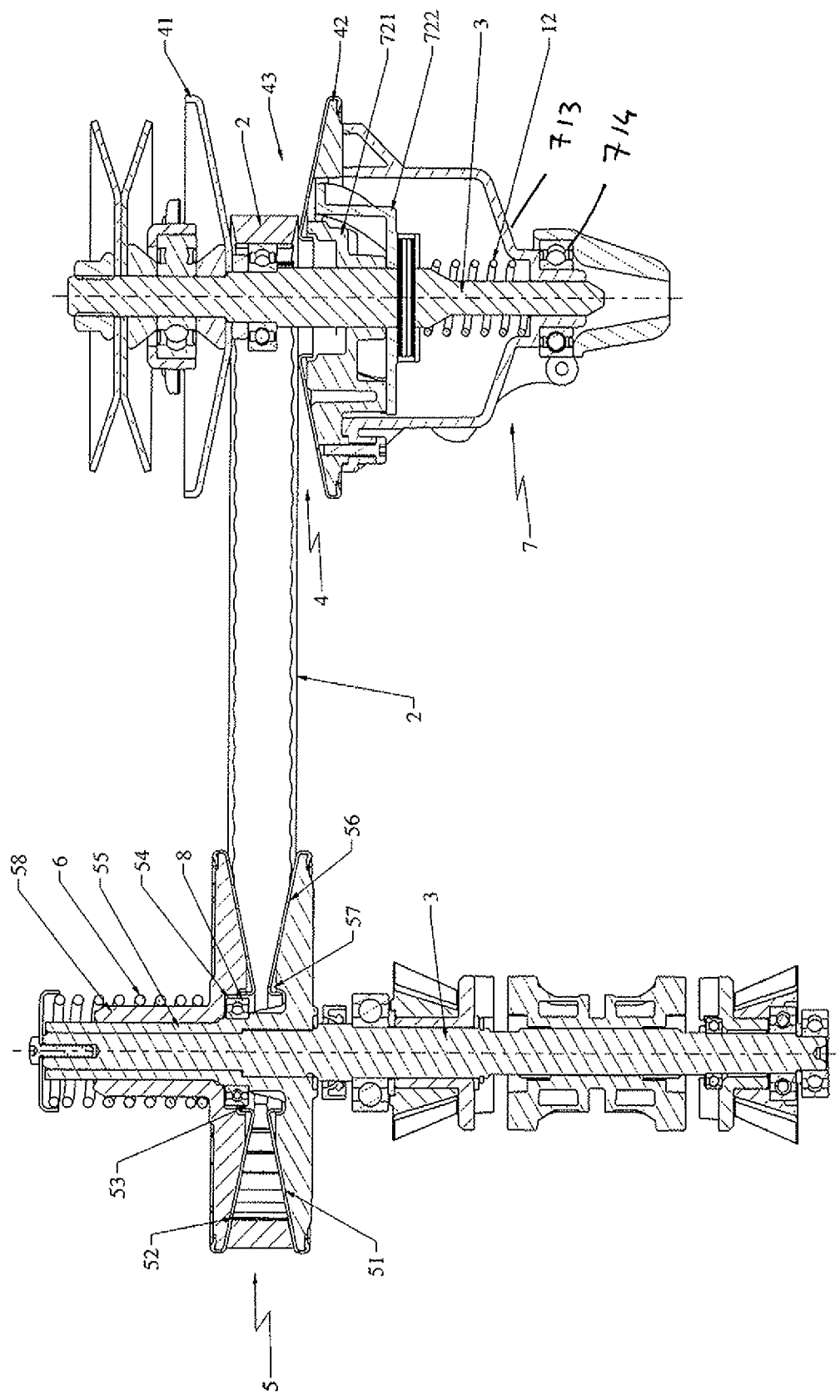
FIGS. 3 to 6 show sectional views of the variable-speed drive in the disengaged position (FIG. 3), in the minimum speed position (FIG. 4), in the maximum speed position (FIG. 5) and in the position bearing against the idle member (FIG. 6).
Figure 4:
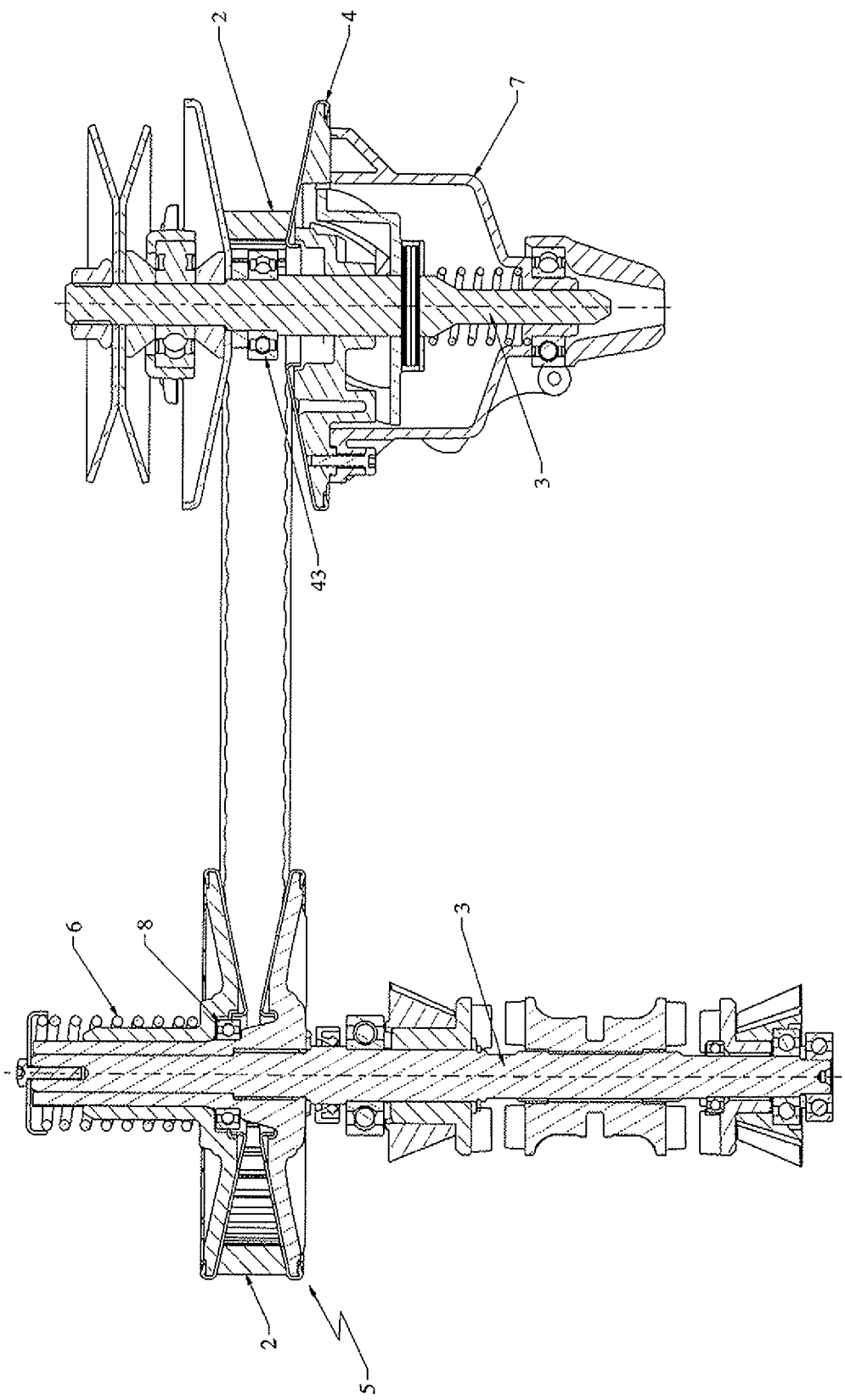
Figure 5:
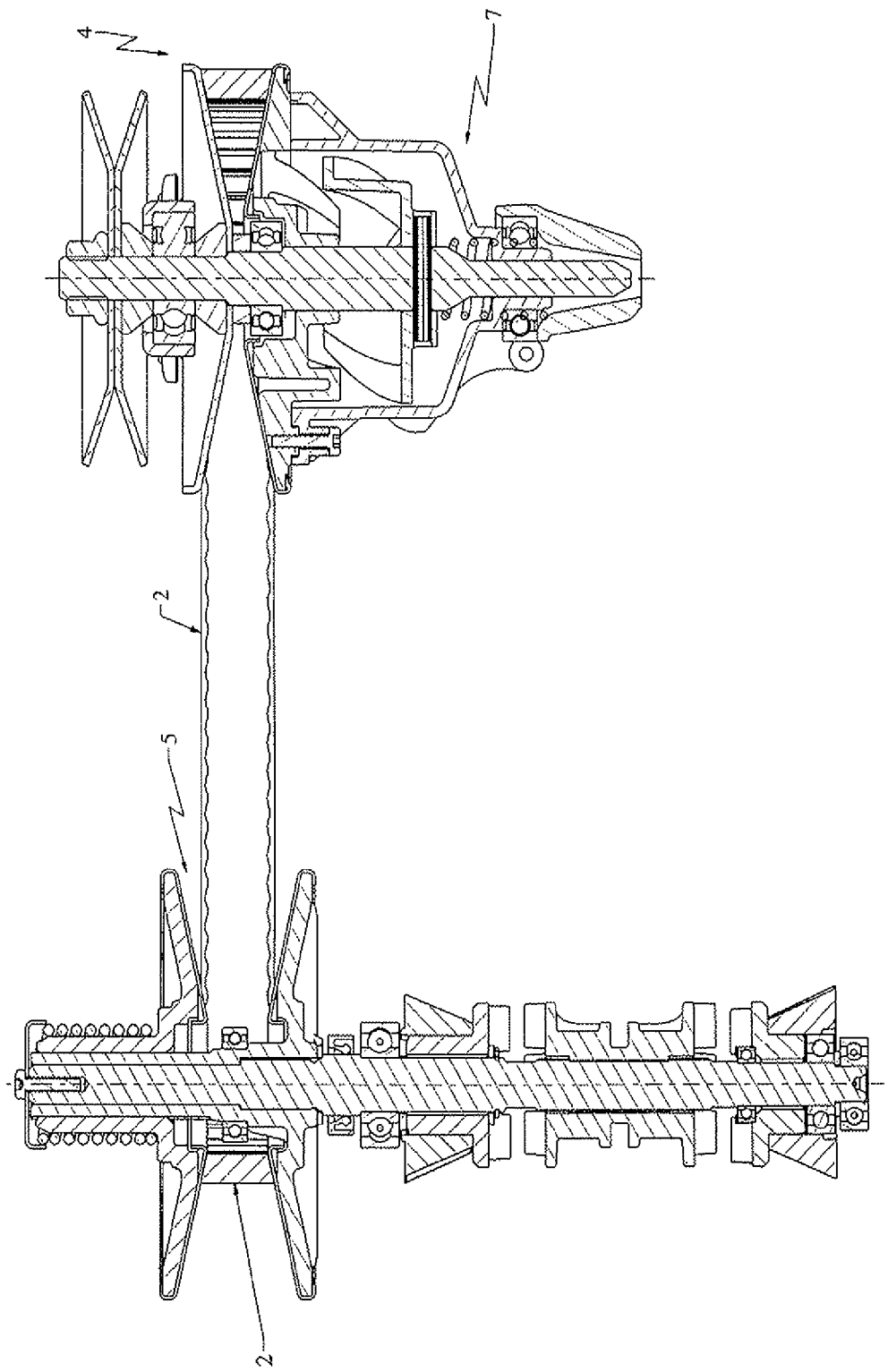
Figure 6:
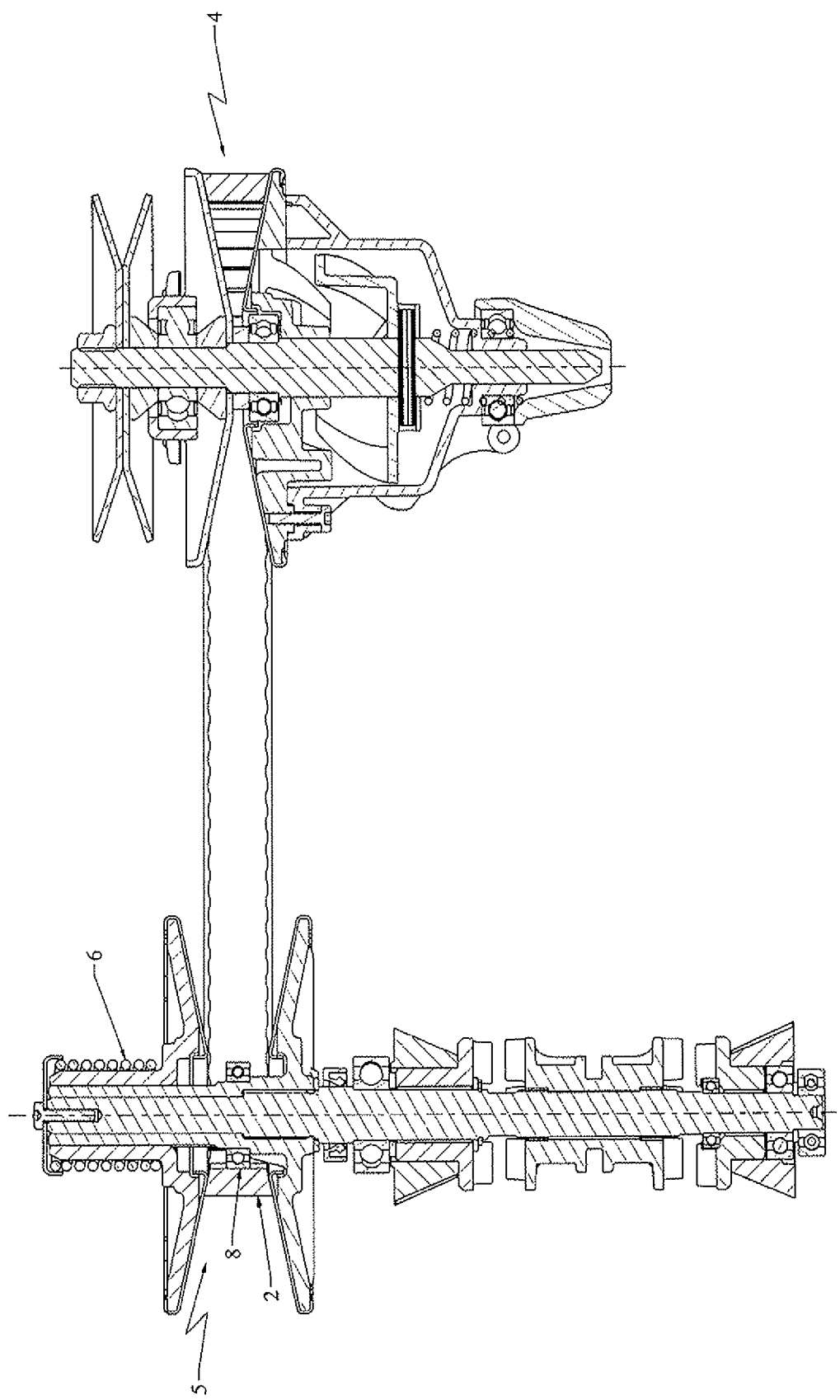

The operation of such a variable-speed drive is as follows. In the absence of any activation, the variable-speed drive occupies a position according to FIG. 3. The flanges 41, 42 of the driving pulley 4 are moved away from one another. The belt bears against the disengagement bearing 43. In the region of the driven pulley 5, the flanges are moved closer together by the spring 6 and the belt is in the position of the greatest winding diameter, in the groove of the driven pulley. The idle member 8 is retracted into the annular housing 54 of the movable flange 52 of the driven pulley 5. During manual actuation of the control device 7 of the variable-speed drive, the flange 42 of the driving pulley 4 is axially displaced along the shaft 3 in the direction of the flange 41 of the driving pulley. When said flanges are moved closer together, the winding diameter of the belt increases and the belt moves away from the disengagement bearing 43 to occupy a position corresponding to the speed, the so-called minimum speed, of the variable-speed drive according to FIG. 4. When the flanges 41, 42 of the driving pulley 4 continue to be moved closer together, the winding diameter of the belt in the groove of the driving pulley increases whilst the winding diameter of the belt in the region of the driven pulley reduces until the speed is obtained, the so-called maximum speed, of the variable-speed drive shown in FIG. 5 where the belt is in the vicinity of the bottom of the groove. In this position, the disengagement bearing 43 is retracted into an annular housing of the movable flange of the driving pulley 4. If the resistant torque becomes too great on the bearing shaft 3 of the driven pulley 5, the belt tends to move closer to the idle member 8 until it comes into contact with the external peripheral surface 82 of the idle member 8 as FIG. 6 illustrates. In this position, the belt, which is a trapezoidal belt, slides against the flanges 51, 52 of the driven pulley 5. In this position, clearance is maintained between the dish 11 at the end of the bearing shaft of the driven pulley, this dish forming an axial stop of the spring 6, and the free end of the shank of the movable flange of said driven pulley to permit the capacity for axial displacement of the movable flange 52 of the driven pulley to be maintained. As soon as the resistant torque applied to the bearing shaft of the driven pulley reduces and returns to a value permitting the belt to move away from the idle member 8, under the action of the spring 6, the variable-speed drive returns to maximum speed. The return to minimum speed of the variable-speed drive or the disengaged position is carried out by releasing the manual control or actuating said manual control in reverse to cause the flanges of the driving pulley 4 to be moved away from one another and, under the action of the spring 6, the flanges of the driven pulley to be moved closer together.

The invention claimed is:

1. A variable-speed belt drive of the type comprising at least: two shafts which are able to be positioned substantially parallel to one another, two flange pulleys, one the driving pulley, the other the driven pulley, one of the flange pulleys being carried by one of the shafts, the other of the flange pulleys being carried by the other of said shafts and interconnected by said belt, the flanges of said pulleys being mounted at a variable interspacing on the shaft which bears them, one speed variation device controlled by moving the flanges of the driving pulley closer together/away from one another, means for restoring flanges of said driven pulley into the position where they are moved closer together, wherein the speed variation device controlled by moving the flanges closer together/away from one another comprises means for control by moving the flanges of the driving pulley closer together by so-called manual control, and control assisting means by moving the flanges of the driving pulley closer together, and the shaft of the driven pulley is provided with at least one idle member such as a bearing, a roller or a ring, having an external peripheral surface mounted freely in terms of rotation on said shaft of the driven pulley and about which the belt is capable of being wound at least partially and partially bears in the position of the flanges of the driven pulley where they are moved away from one another, corresponding to the position of the smallest winding diameter of the belt about said shaft of the driven pulley, the idle member, being in this position of contact with the belt, acts in the function of torque limiter.

2. The variable-speed drive as claimed in claim 1, wherein the control assisting means by moving the flanges of the driving pulley closer together comprise a cam formed by two coaxial plates having inclined ramps with sliding contact, one of the plates being fixed in terms of rotation to the, or a, movable flange of the driving pulley, the other plate being fixed in terms of rotation to the bearing shaft of the driving pulley, said plates tending to move away from one another in the direction of the flanges of the driving pulley being moved closer together under the action of the transmitted torque.

3. The variable-speed drive as claimed in claim 1, wherein the idle member is axially immobilized on the shaft of the driven pulley.

4. The variable-speed drive as claimed in claim 1, wherein one of the flanges of the driven pulley, recessed in the center so as to be able to be threaded onto the shaft of said driven pulley, is provided about the central recess with an annular housing of the idle member, when said flanges are moved closer together.

5. The variable-speed drive as claimed in claim 1, wherein the means for restoring the flanges of said driven pulley into the position where they are moved closer together comprise at least one spring.

6. The variable-speed drive as claimed in claim 5, wherein, in the position of the smallest winding diameter of the belt about said shaft of the driven pulley, when the belt bears against the external peripheral surface of the idle member, one of the flanges of the driven pulley is mounted with clearance and is axially displaceable along said shaft of the driven pulley in the direction of being moved away from the other flange of said driven pulley.

7. The variable-speed drive as claimed in claim 6, wherein the flange of the driven pulley, mounted with clearance and axially displaceable along said bearing shaft of the driven pulley, in the position of the smallest winding diameter of the belt about said shaft of the driven pulley (5), when the belt bears against the external peripheral surface of the idle member, is the flange which is spring-loaded.

8. The variable-speed drive as claimed in claim 4, wherein one of the flanges that is fixed, of the driven pulley is produced in one piece with a core threaded onto the bearing shaft of the pulley and mounted fixedly in terms of rotation on said shaft, the other flange, the so-called movable flange, of the driven pulley is recessed in the center and received by nesting on said core for being mounted in an axially free manner and fixedly in terms of rotation to said core, the movable flange is provided with the means for restoring the flanges of the driven pulley into the position where they are moved closer together, said flanges define relative to one another a groove of variable dimension, the belt of the variable-speed drive being able to be inserted therein, at least one of the flanges is a flange made of synthetic material provided, on its surface opposite the other flange, with a metal covering taking the form of a dish recessed in the center, and the dish in its zone adjacent to the central recess is moved away from the flange which it covers by a space, the so-called annular peripheral space, which by preventing any direct contact between the flange and the dish reduces in said zone the heat exchange between the flange and the dish, when the dish is assembled to the flange.

9. The variable-speed drive as claimed in claim 8, wherein the movable flange of the driven pulley is formed from a circular plate recessed in the center, said central recess being provided with an edge protruding at least on one side from said plate, so as to form a shank coaxial with the core of the pulley, said edge being an edge comprising a shoulder to create the annular housing of the idle member when said flanges are moved closer together, the means restoring the movable flange in the direction of the fixed flange taking the form of a helicoidal spring wound around the shank of the movable flange.

10. The variable-speed drive as claimed in claim 1, wherein the driving pulley, one of the flanges thereof, the so-called fixed flange, being mounted fixedly in terms of rotation on the bearing shaft of the driving pulley and the other flange thereof, the so-called movable flange, being mounted in an axially movable manner on the bearing shaft of the driving pulley in the direction of being moved closer to the fixed flange by means of the speed variation device, is a disengageable pulley and comprises disengagement means formed by at least one annular part arranged between said flanges, said annular part having an external peripheral surface, mounted freely in terms of rotation relative to the bearing shaft of the driving pulley, and about which the belt is wound at least partially in the disengaged position corresponding to the position in which the flanges are moved away from one another so as to prevent any transmission of movement between the pulley bearing shafts, the movable flange of the driving pulley covering the annular part when the flanges of said pulley are moved closer together, so as to permit the winding of the belt inside the groove formed by the flanges and to permit the passage of the variable-speed drive into the engaged position, and continuing to move the flanges of the driving pulley closer together permits the variation of the speed as required.

11. The variable-speed drive as claimed in claim 1, wherein the driving pulley is provided with resilient means for restoring the flanges thereof into the position where they are moved away from one another.

12. The variable-speed drive as claimed in claim 1, wherein the means for control by moving the flanges of the driving pulley closer together by manual control comprise a control member which is able to be coupled to a lever, a handle or a pedal which is able to be actuated by the hand or the foot of the operator.

13. The variable-speed drive as claimed in claim 12, wherein as the driving pulley is of the type where one of the flanges, the so-called movable flange, is mounted in an axially movable manner on the bearing shaft of the driving pulley in the direction of being moved closer to the other flange of the pulley, the control member of the means for control by moving the flanges of the driving pulley closer together by manual control is activated by pushing directly or indirectly on said flange.

14. The variable-speed drive as claimed in claim 13, wherein when the control member of the means for control by moving the flanges of the driving pulley closer together is activated on said movable flange of the driving pulley by pushing indirectly, said control member is activated by pushing via a bell-shaped part threaded onto the bearing shaft of the driving pulley and mounted fixedly in terms of rotation on said flange, said bell being provided at its apex with a bearing on which the control member is capable of acting.

15. The variable-speed drive as claimed in claim 2, wherein the idle member is axially immobilized on the bearing shaft of the driven pulley.

16. The variable-speed drive as claimed in claim 2, wherein one of the flanges of the driven pulley, recessed in the center so as to be able to be threaded onto the bearing shaft of said pulley, is provided about the central recess with an annular housing of the idle member, when said flanges are moved closer together.

17. The variable-speed drive as claimed in claim 1, wherein in the position of the smallest winding diameter of the belt about said shaft of the driven pulley, when the belt bears against the external peripheral surface of the idle member, one of the flanges of the driven pulley is mounted with clearance and is axially displaceable along said bearing shaft of the driven pulley in the direction of being moved away from the other flange of said pulley.

18. The variable-speed drive as claimed in claim 1, wherein one of the flanges, the so-called fixed flange, of the driven pulley is produced in one piece with a core threaded onto the bearing shaft of the pulley and mounted fixedly in terms of rotation on said shaft, the other flange, the so-called movable flange, of the driven pulley is recessed in the center and received by nesting on said core for being mounted in an axially free manner and fixedly in terms of rotation to said core, the movable flange is provided with the means for restoring the flanges of the driven pulley into the position where they are moved closer together, said flanges define relative to one another a groove of variable dimension, the belt of the variable-speed drive being able to be inserted therein, at least one of the flanges is a flange made of synthetic material provided, on its surface opposite the other flange, with a metal covering taking the form of a dish recessed in the center, and the dish in its zone adjacent to the central recess is moved away from the flange which it covers by a space, the so-called annular peripheral space, which by preventing any direct contact between the flange and the dish reduces in said zone the heat exchange between the flange and the dish, when the dish is assembled to the flange.

* * * * *